United States Patent
Oetting et al.

(10) Patent No.: US 12,515,233 B2
(45) Date of Patent: Jan. 6, 2026

(54) SPRAY COATING SYSTEM AND METHOD

(71) Applicant: Hartman Walsh Corp., St. Louis, MO (US)

(72) Inventors: Todd Oetting, Festus, MO (US); Steven D. Chism, St. Albans, MO (US); Jess Chism, St. Paul, MO (US); Josh Lahr, Brighton, IL (US); Andrew Jenkins, Brighton, IL (US)

(73) Assignee: HARTMAN WALSH CORP., Saint Louis, MO (US)

( * ) Notice: Subject to any disclaimer, the term of this patent is extended or adjusted under 35 U.S.C. 154(b) by 490 days.

(21) Appl. No.: 17/726,893

(22) Filed: Apr. 22, 2022

(65) Prior Publication Data
US 2022/0371038 A1 Nov. 24, 2022

Related U.S. Application Data

(60) Provisional application No. 63/191,569, filed on May 21, 2021.

(51) Int. Cl.
*F16L 55/32* (2006.01)
*B05B 13/06* (2006.01)
(Continued)

(52) U.S. Cl.
CPC .......... *B05B 13/0627* (2013.01); *B05D 7/225* (2013.01); *F16L 55/32* (2013.01);
(Continued)

(58) Field of Classification Search
USPC .................. 118/306, 317, 323, DIG. 10, 712
See application file for complete search history.

(56) References Cited

U.S. PATENT DOCUMENTS 4,216,738 A * 8/1980 Muta .................... B05B 13/0627
  118/317
4,862,808 A * 9/1989 Hedgcoxe .............. B62D 61/10
  105/365

(Continued)

FOREIGN PATENT DOCUMENTS

CN 107999311 B * 2/2020 ......... B05B 13/0636
JP 2015190893 A * 11/2015
(Continued)

OTHER PUBLICATIONS

English Translation KR-20120009340-A (Year: 2012).*
English Translation JP 2015190893 A (Year: 2015).*
English Translation KR 20050122953A (Year: 2005).*

*Primary Examiner* — Yewebdar T Tadesse
(74) *Attorney, Agent, or Firm* — The Small Patent Law Group LLC; Christopher R. Carroll

(57) ABSTRACT

A spray coating system includes a spraying robot sized to fit within a conduit. The spraying robot includes arms that extend outward and retract inward to maintain contact with an interior surface of the conduit. The spraying robot is configured to be coupled with hoses that separately supply different fluids to the spraying robot. The spraying robot includes a spray head from which a compound formed from the fluids is sprayed onto the interior surface of the conduit. The spraying robot is configured to be pulled through the conduit and/or self-propel in the conduit to spray the compound onto the interior surface of the conduit and form a coating thereon.

18 Claims, 10 Drawing Sheets

(51) Int. Cl.
*B05D 7/22* (2006.01)
*F16L 55/44* (2006.01)
*F16L 55/46* (2006.01)
*F16L 101/16* (2006.01)

(52) U.S. Cl.
CPC ............... *F16L 55/44* (2013.01); *F16L 55/46* (2013.01); *F16L 2101/16* (2013.01)

(56) References Cited

U.S. PATENT DOCUMENTS

| | | | | |
|---|---|---|---|---|
| 8,402,911 | B1 * | 3/2013 | Weisenberg | B05B 13/0636 |
| | | | | 427/236 |
| 8,468,968 | B2 * | 6/2013 | Weisenberg | C08G 18/36 |
| | | | | 118/317 |
| 2018/0031168 | A1 * | 2/2018 | Littlestar | F16L 55/46 |

FOREIGN PATENT DOCUMENTS

| KR | 20050122953 A | * | 12/2005 |
|---|---|---|---|
| KR | 20120009340 A | * | 2/2012 |
| KR | 20130128883 A | * | 11/2013 |

* cited by examiner

SPRAY COATING SYSTEM AND METHOD

CROSS-REFERENCE TO RELATED APPLICATIONS

This application claims priority to U.S. Provisional Application No. 63/191,569 (filed 21 May 2021), the entire disclosure of which is incorporated herein by reference.

BACKGROUND

Technical Field

The inventive subject matter described herein relates generally to spray coating systems and methods for spraying fluids onto surfaces of structures, such as spray coating systems and methods that apply multi-component compounds onto interior surfaces of structures such as conduits.

Background

Cylindrical structures may be used as conduits for controlling the flow of fluids to and from locations. For example, water utility spray coating systems have a series of pipes that carry water to homes, businesses, etc. As another example, gas or fuel lines can carry gas or fuel between different locations. Over time, these conduits can degrade. As a result, the conduits may rupture, have undesirable or dangerous components in or around the conduits be exposed to the interior of the conduits (e.g., lead, rust, asbestos, etc.), or the like.

Replacement of these conduits can be prohibitively expensive and/or consume significant amounts of time. Additionally, many of these conduits are too small in diameter to allow for a person to enter the conduits and treat (e.g., coat) the interior of the conduits.

BRIEF DESCRIPTION

In one embodiment, a spray coating system includes a spraying robot sized to fit within a conduit. The spraying robot includes arms that extend outward and retract inward to maintain contact with an interior surface of the conduit. The spraying robot is configured to be coupled with hoses that separately supply different fluids to the spraying robot. The spraying robot includes a spray head from which a compound formed from the fluids is sprayed onto the interior surface of the conduit. The spraying robot is configured to be pulled through the conduit and/or self-propel in the conduit to spray the compound onto the interior surface of the conduit and form a coating thereon.

In another example, a spray coating system includes a spraying robot sized to fit within a conduit. The spraying robot may include movable arms that maintain contact with a changing interior surface of the conduit as the spraying robot moves through the conduit. The spraying robot may move through the conduit and spray a compound onto the interior surface of the conduit and form a coating thereon as the spraying robot moves along the changing interior surface of the conduit.

The movable arms of the spraying robot may remain engaged with the changing interior surface of the conduit as the spraying robot moves along and sprays the compound onto the interior surface of the conduit. The movable arms of the spraying robot may remain engaged with the changing interior surface of the conduit as the conduit includes one or more of a changing inner diameter or a bend. The movable arms of the spraying robot may separately move by different distances at a same time. The spraying robot may include a spray head from which the compound is sprayed onto the interior surface of the conduit. The movable arms may separately move to maintain contact with the interior surface of the conduit while keeping the spray head of the spraying robot along a center of the conduit.

In another example, a method (e.g., for coating an interior surface of a conduit) may include propelling a spraying robot through an interior of the conduit while maintaining contact between the spraying robot and the interior surface of the conduit during one or more of changes in an inner diameter of the conduit or bends in the conduit. The method also may include spraying a compound from the spraying robot onto interior surfaces of the conduit as the spraying robot moves through the interior of the conduit while maintaining the contact between the spraying robot and the interior surface of the conduit during the one or more of the changes in the inner diameter of the conduit or the bends in the conduit.

DETAILED DESCRIPTION

Figure 1:
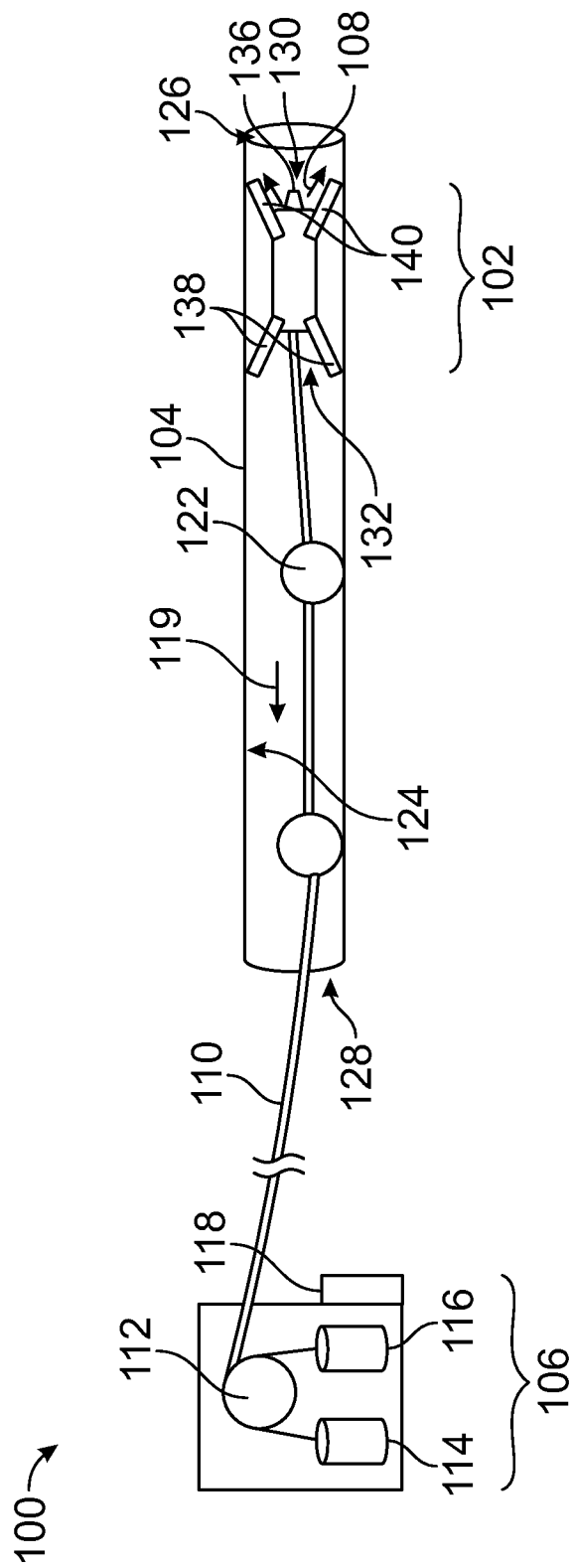
FIG. 1 is a schematic illustration of an embodiment of a spray coating system.

The foregoing summary, as well as the following detailed description of certain embodiments of the inventive subject matter, will be better understood when read in conjunction with the appended drawings. The various embodiments are not limited to the arrangements and instrumentality shown in the drawings. As used herein, an element or step recited in the singular and proceeded with the word "a" or "an" should be understood as not excluding plural of said elements or steps, unless such exclusion is explicitly stated. Furthermore, references to "one embodiment" or "an embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It should be noted that although one or more embodiments may be described in connection with spray coating systems and methods spraying applying multi-component compounds having relatively short pot lives onto interior surfaces of structures, not all embodiments of the inventive subject matter are limited in this manner. For example, spray coating systems and methods described herein may be used to apply single component fluids, to apply the compounds or fluids in a manner other than spraying (e.g., by using a brush, roller, or other technique), to apply the compounds or fluids to exterior surfaces, or the like.

Figure 2:
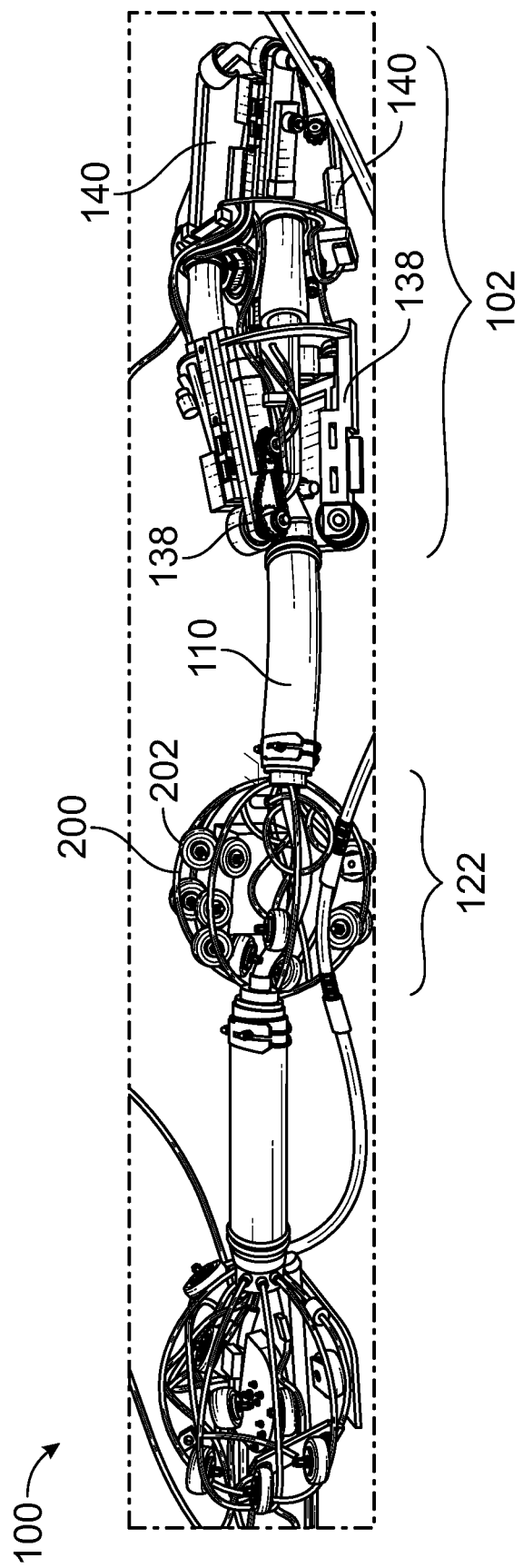
FIG. 2 is an image of part of the spray coating system shown in FIG. 1.

FIG. 1 is a schematic illustration of an embodiment of a spray coating system 100. FIG. 2 is an image of part of the spray coating system 100 shown in FIG. 1. The components shown in FIG. 1 are not drawn to scale. The spray coating system 100 includes a spraying robot 102 that is placed into a conduit 104, such as a cylindrical or other shaped conduit for the flow of a fluid (e.g., air, water, or the like). Alternatively, the conduit 104 may be another structure and/or of a different shape. While the spraying robot 102 is not shown in dashed lines in FIG. 1, the spray coating system 100 is partially disposed within the conduit 104 such that an interior surface 124 of the conduit 104 at least partially surrounds the spraying robot 102 during operation.

The spraying robot 102 moves within the conduit 104 in order to apply fluids onto the interior surface 124 of the conduit 104. In an embodiment, the spraying robot 102 sprays a compound 108 formed from fluids onto the interior surface 124 from a spray head 136. The spray head 136 may include holes and may move (e.g., rotate, spin, oscillate, or the like) to direct (e.g., spray, fling, throw, etc.) the fluid compound 108 out of the spray head 136 through the holes in the spray head. The compound 108 is directed onto the interior surface 124 to form a coating on the interior surface 124.

The compound 108 may be a multi-component mixture, such as a coating that seals, repairs, and/or reduces a coefficient of friction of the interior surface 124. The term "multi-component compound" may refer to a fluid compound formed from two or more fluids and that has a relatively short pot life. For example, a multi-component compound may be formed from a mixture of two or more different fluids that set, cure, coagulate, dry, or otherwise solidify in a relatively rapid manner. The pot life of the multi-component compound 108 may be sufficiently short that the fluids cannot be pre-mixed, loaded onto the spraying robot 102, and carried by the spraying robot 102 until the fluids are sprayed onto the interior surface 124 of the conduit 104 without the fluid compound clogging one or more lines, hoses, nozzles, or other conduits of the spraying robot 102.

Instead, a base station system 106 of the system 100 can be fluidly coupled with the spraying robot 102 by hoses or other conduits and cables (with a set of the conduits and/or cables represented as 110 in FIG. 1, even though 110 can represent two or more conduits and at least one cable) that extend from the spraying robot 102 to the base station system 106. The base station system 106 can represent a housing, container, vehicle, (e.g., truck), or the like, that includes or holds a reel 112 and containers 114, 116. The reel 112 can be coupled with the spraying robot 102 by one or more cables in the conduits and cables 110. The reel 112 can include a motor that rotates the reel 112 to pull the spraying robot 102 within and out of the conduit 104 in a direction 119.

The containers 114, 116 in the base station system 106 can separately hold the fluids used to form the compound that is sprayed onto the interior surface 124 of the conduit 104. The hoses in the conduits and cables 110 can be fluidly coupled with the spraying robot 102 and the containers 114, 116 such that the fluids in the container 114, 116 are separately carried along the length of the conduit 104 to the spraying robot 102. The base station system 106 can include pumps to force the fluids down the hoses to the spraying robot 102 for spraying on the interior surface 124 of the conduit 104. Additionally or alternatively, the base station system 106 can include pumps to pull the fluids down the hoses from the containers 114, 116 to the spraying robot 102. The base station system 106 can include one or more heating elements or heaters that increase the temperature of the fluids to help reduce or keep the viscosity of the fluids in the containers 114, 116 low.

The base station system 106 optionally can include a control system 118 that represents hardware circuitry having and/or connected with one or more processors (e.g., microprocessors, field programmable gate arrays, integrated circuits, or the like) that control operation of the base station system 106. Optionally, the control system 118 may be disposed onboard the spraying robot 102.

The control system 118 can have one or more input devices (e.g., keyboard, touchscreen, electronic mouse, etc.) and/or one or more output devices (e.g., displays, the same or different touchscreen as the input device, etc.). An operator can provide input via the input device(s) to control operation of the spraying robot 102 and view operation of the spraying robot 102 via the output device(s). For example, the output device(s) can display images or video from one or more cameras or optical sensors mounted to the spraying robot 102, can display a moving speed of the spraying robot 102, can display positions of arms of the spraying robot 102 (described below), can display how much of the compound is being sprayed by the spraying robot 102, and the like. The spraying robot 102 can include several cameras and optionally lights 1000 (shown in FIG. 10) to provide the operator at the control system 118 with multiple different views of the spraying robot 102 and the conduit 104.

The system 100 can include one or more rolling trucks 122 that support the cables and hoses 110 connected with the spraying robot 102. The rolling trucks 122 can represent wireframe bodies 200 (e.g., cages, shown in FIG. 2) having rollers or wheels 202 (shown in FIG. 2), sleds, or the like, that roll or slide along the interior surface 124 of the conduit 104 to reduce the friction between the cables and hoses 110 and the interior surface 124 of the conduit 104. For example, the cables and hoses 110 can be heavy with the fluids in the hoses and due to the cables and hoses 110 being long to reach the spraying robot 102 (e.g., the hoses and cables 110 may weigh hundreds of pounds, even up to one thousand pounds when full of the fluids, and be hundreds of feet long, such as one hundred feet long to over a thousand feet long). This length and weight can require a significant amount of force to pull the hoses and cables 110 along the interior surface 124 of the conduit 104. The trucks 122 can have wheels and/or a reduced coefficient of friction while moving along the interior surface 124 of the conduit 104 and can lift at least some (but not all) of the hoses and cables 110 off the interior surface 124 of the conduit 104. Alternatively, the trucks 122 may lift and keep all of the hoses and cables 110 off the interior surface 124 of the conduit 104. Lifting the hoses and cables 110 off the interior surface 124 of the conduit 104 for all or part of the lengths of the hoses and cables 110 can reduce the amount of force needed to pull the hoses and cables 110 and the spraying robot 102 through the conduit 104 (relative to not using or not having the rolling trucks 122).

In operation, the spraying robot 102 is placed into the conduit 104 through one end 128 of the conduit 104 with a tow head device and tow cable (described below) inserted in an opposite end 126 of the conduit 104. The tow cable and tow head device are used to pull the spraying robot 102 through the length of the conduit 104 toward the end 126 (without removing the spraying robot 102 out of the end 126). The tow head device and tow cable then separate from the spraying robot 102 and are removed from the conduit 104. The spraying robot 102 has a spraying end 130 that faces the end 126 of the conduit 104 in which the spraying robot 102 was inserted into the conduit 104. The spraying robot 102 includes a pulling or leading end 132 that is opposite the spraying end 130 and that faces the direction 119 in which the spraying robot 102 moves and/or is pulled within the conduit 104.

The spraying robot 102 includes several arms 138, 140 that move outward and inward to support the spraying robot 102 in the conduit 104 and optionally to propel the spraying robot 102 along the interior surface 124 of the conduit 104. Each of these arms 138, 140 extends from a connected end 142 that is coupled with the spraying robot 102 to an opposite contact end 144 that can contact the interior surface 124 of the conduit 104 to support and/or center the spraying robot 102 in the conduit 104.

The arms 138 can be positioned closer to the leading end 132 of the spraying robot 102 than the spraying end 130 of the spraying robot 102. The arms 140 can be positioned closer to the spraying end 130 of the spraying robot 102 than the leading end 132 of the spraying robot 102. In one embodiment, the leading end arms 140 can include wheels, treads, or the like, that are rotated by motors in the arms 140 and/or mounted to the spraying robot 102 to propel or assist with propelling the spraying robot 102 along the interior surface 124 of the conduit 104. These arms 140 can be controlled by electronic signals from the control system 118 via the hoses and cables 110.

In one embodiment, the spraying end arms 138 can include wheels, rollers, or the like, that may freely rotate on the interior surface 124 of the conduit 104 as the spraying robot 102 moves and/or is moved by the reel 112 in the conduit 104. The spraying end arms 138 may not include motors or otherwise generate propulsive force to move the spraying robot 102 in the conduit 104. These arms 138 can be controlled by pneumatic signals from the control system 118 via the hoses and cables 110 (e.g., pressure changes). Alternatively, the control system 118 may send electronic signals to a pump onboard the spraying robot 102 to pneumatically actuate the arms 138. In another embodiment, the arms 138 may include motors and wheels, treads, etc. that are rotated by the motors to generate propulsion and assist with moving the spraying robot 102 in the conduit 104.

The arms 138, 140 can be independently controlled. For example, the control system 116 can send electronic signals or pneumatic signals (e.g., changes in pressure) via the hoses and conduits 108 to direct each arm 138, 140 to extend the contact end 134 of the arm 138, 140 outward toward the interior surface 124 and farther from the remainder of the spraying robot 102. The spraying robot 102 includes linear actuators, hydraulic cylinders, motors, or other devices to move the arms 138, 140 (e.g., extend the arms 138, 140 outward and retract the arms 138, 140 inward). The control system 116 can send electronic signals or pneumatic signals via the hoses and conduits 108 to direct each arm 138, 140 to retract the contact end 134 of the arm 138, 140 inward away from the interior surface 124 and toward the remainder of the spraying robot 102. Each arm 138, 140 can be independently or separately controlled in that each arm 138, 140 can move differently than the other arms 138, 140, and the movement of one arm 138, 140 does not require the same or similar movement of any other arm 138, 140.

Figure 3:
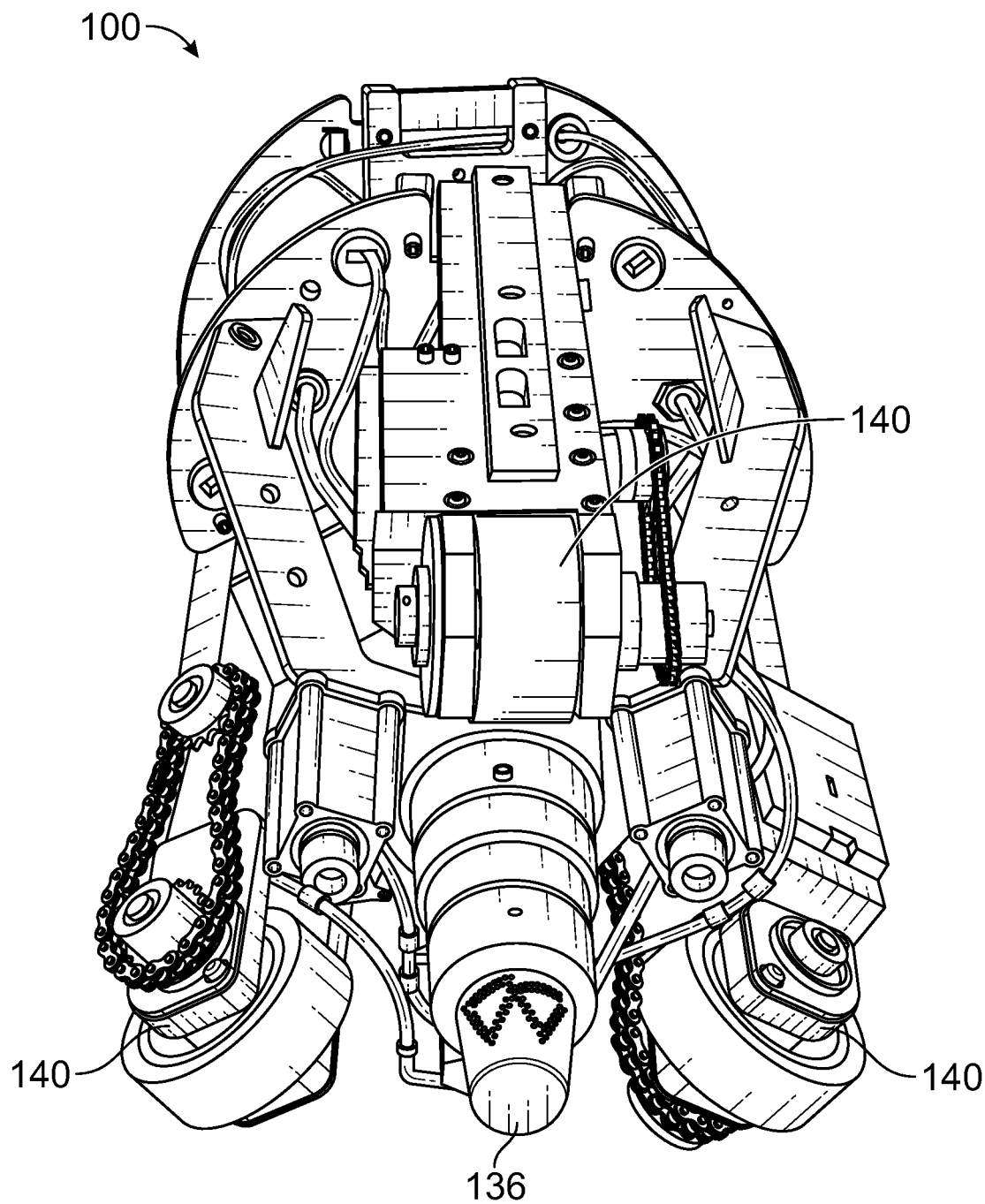
FIG. 3 illustrates arms of the spraying robot shown in FIG. 1 in a retracted state or position.
Figure 4:
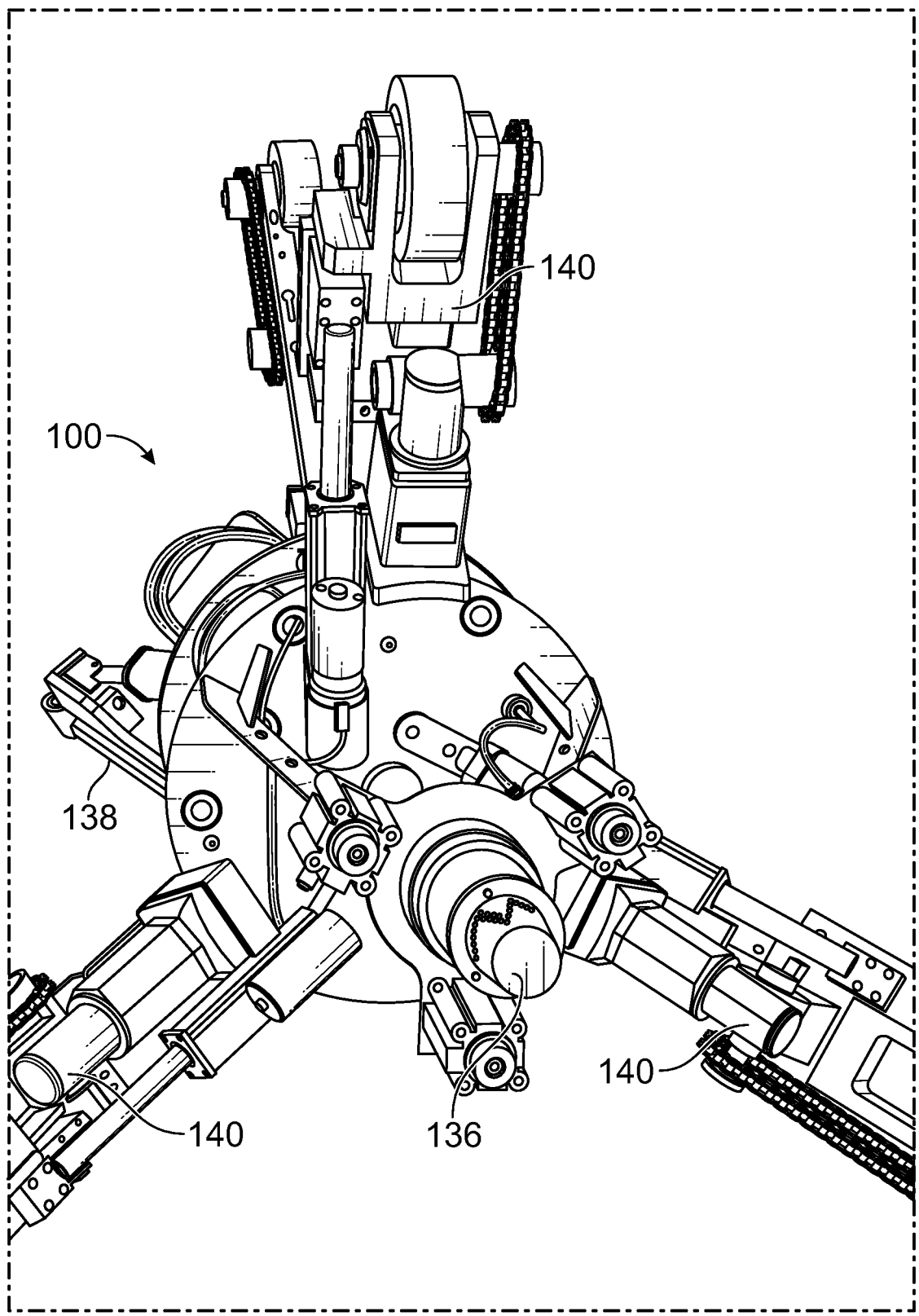
FIG. 4 illustrates the arms shown in FIG. 3 in an extended state or position.

The arms 138, 140 can separately extend outward and retract inward to center the spray head 136 in the conduit 104. FIG. 3 illustrates the arms 138, 140 in a retracted state or position and FIG. 4 illustrates the arms 138, 140 in an extended state or position. In one embodiment, there are three arms 138 and three arms 140, which each of the arms 138 positioned one hundred twenty degrees apart from each other along a circle around the leading end 132 of the spraying robot 102 and each of the arms 140 positioned one hundred twenty degrees apart from each other along a circle around the spraying end 130 of the spraying robot 102. Alternatively, a greater or fewer number of the arms 138 and/or the arms 140 may be provided.

Figure 5:
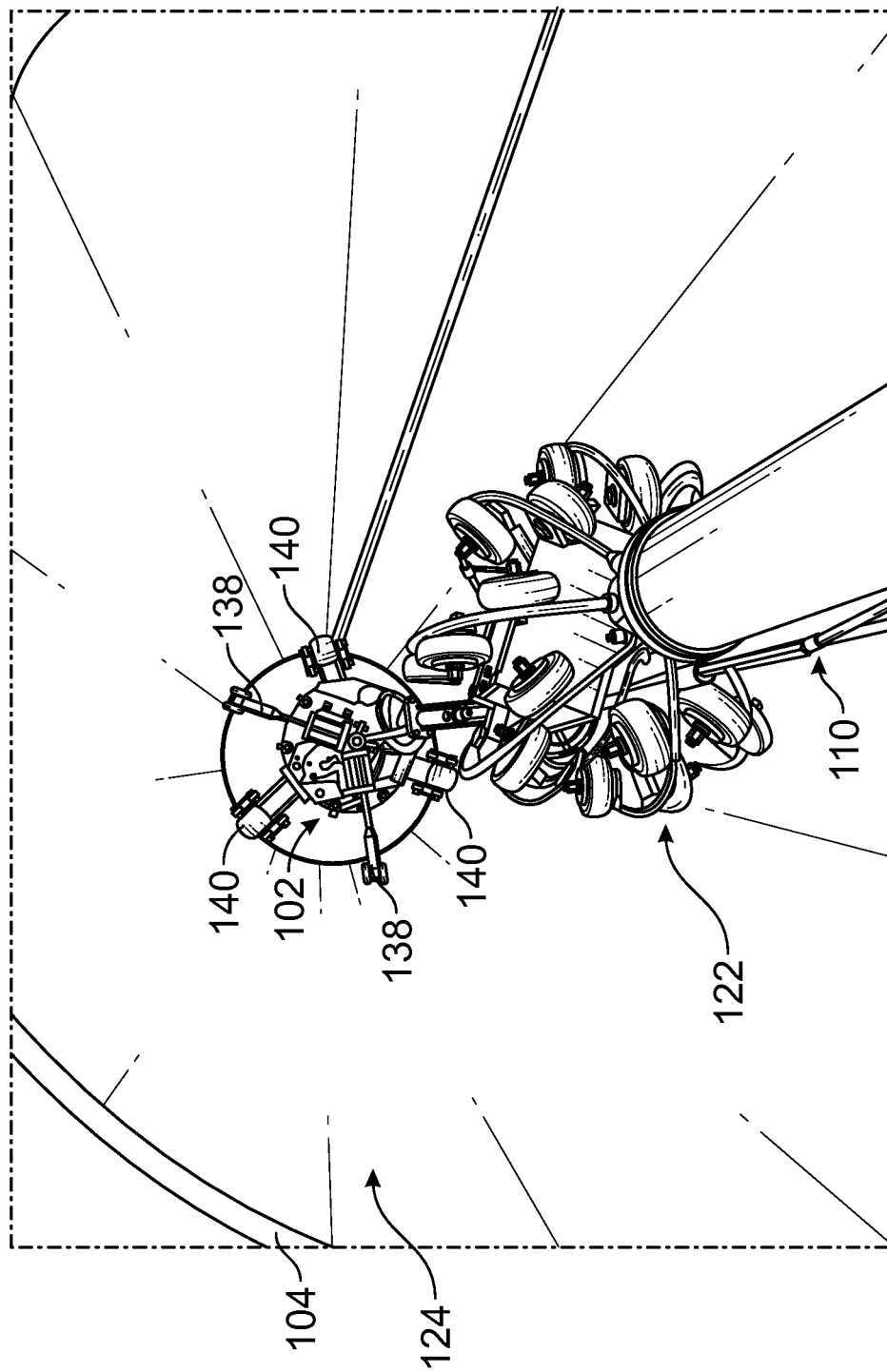
FIG. 5 illustrates a view inside a conduit with the arms of the spraying robot all engaging an interior surface of the conduit.

The arms 138, 140 may be controlled by an operator inputting the size of the conduit 104 (e.g., the inner diameter) and the control system 118 calculating how far to extend the arms 138, 140 so that the arms 138, 140 contact the interior surface 124 of the conduit 104. The arms 140 may generate propulsion to assist with moving the spraying robot 102 along the length of the conduit 104 in the direction 119. The arms 140 may engage the interior surface 124 of the conduit 104 to support the spraying robot 102 and prevent tipping of one end of the spraying robot 102 lower than the other end of the spraying robot 102. For example, the arms 140 can engage the conduit 104 and prevent the spraying head 136 from tilting or being angled downward. FIG. 5 illustrates a view inside the conduit 104 with the arms 138, 140 all engaging the interior surface 124 of the conduit 104.

Figure 6:
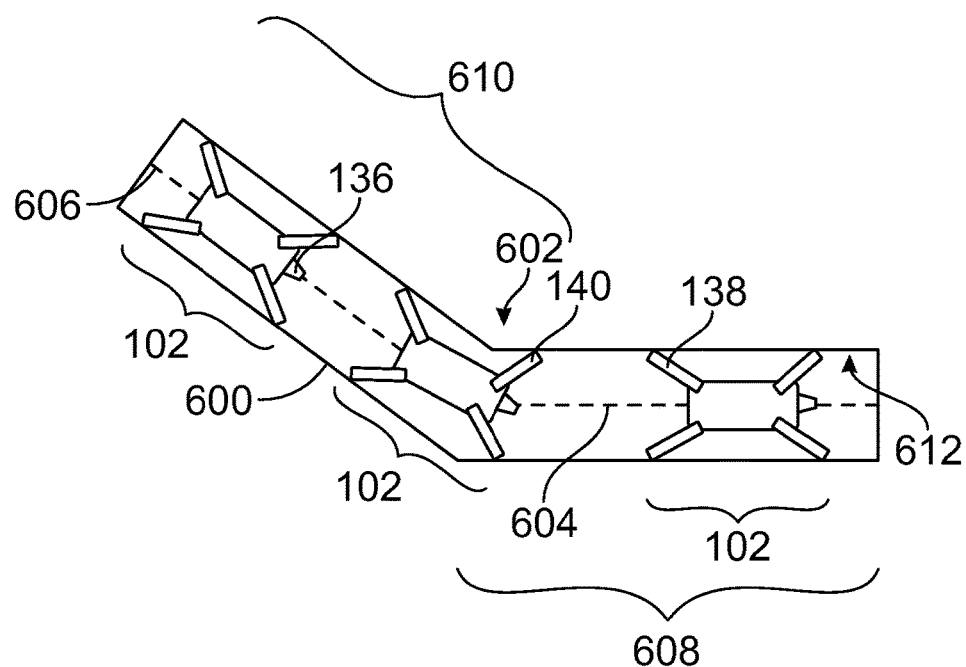
FIG. 6 illustrates movement of the spraying robot within a conduit having a bend or angle in the conduit.

FIG. 6 illustrates movement of the spraying robot 102 within a conduit 600 having a bend or angle 602 in the conduit 600. FIG. 6 also shows center lines 604, 606 of different segments 608, 610 of the conduit 600. The center lines 604, 606 may be equidistant from an interior surface 612 of the conduit 600 in the different segments 608, 610. FIG. 6 shows the spraying robot 102 in three different positions at different times as the spraying robot 102 moves from the right side to the left side in FIG. 6.

The control system 116 can automatically control how far each arm 138, 140 extends outward from the spraying robot 102 to engage the interior surface 612 of the conduit 600. The control system 116 can direct different arms 138, 140 to extend outward different distances at different times so that the spraying head 136 moves along the center lines 604, 606 and remains centered in the conduit 600, even as the spraying robot 102 moves through the bend 602 in the conduit 600 (as shown in FIG. 6).

In one embodiment, the arms 138, 140 may include force sensors that measure the amount of force exerted by the arms 138, 140 on the interior surface 612 of the conduit 600. The control system 116 can automatically change how far each arm 138, 140 extends based on the forces measured by the sensors. For example, the control system 116 can individually adjust the extensions of the arms 138, 140 so that the forces do not exceed a threshold and/or the forces are equal or approximately equal (e.g., within 1% of each other, within 3% of each other, within 5% of each other, or the like). This can help keep the spraying head 136 along the center lines 604, 606 of the conduit 600, even as the spraying robot 102 moves around bends or angles 602. Keeping the spraying head 136 in the center of the conduit 600 can help ensure that the coating applied to the interior surface 612 is even or has an even thickness (e.g., a thickness that does not vary by more than 1%, by more than 3%, by more than 5%, or the like).

Figure 7:
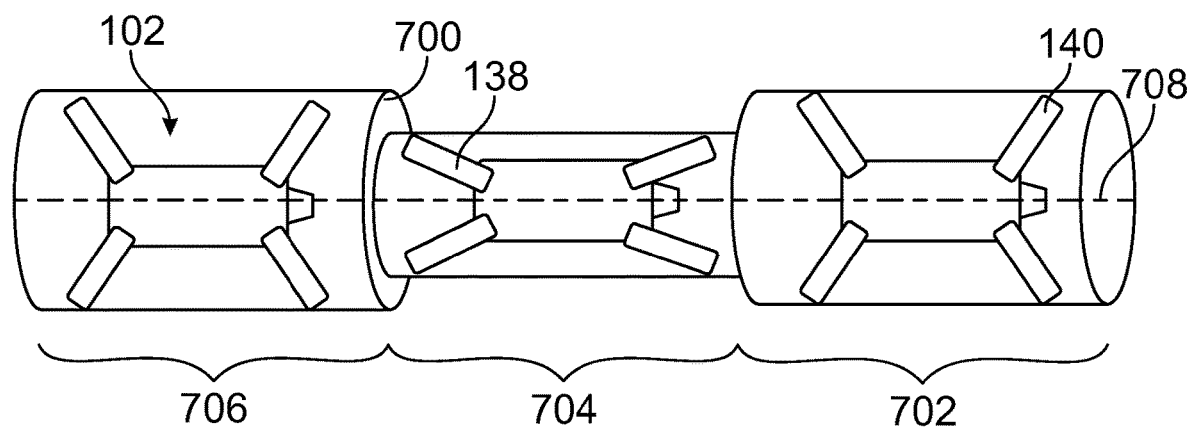
FIG. 7 illustrates one example of movement of the spraying robot within a conduit having different sized segments.

FIG. 7 illustrates one example of movement of the spraying robot 102 within a conduit 700 having different sized segments 702, 704, 706. The segments 702, 704, 706 of the conduit 700 have different diameters, with the segment 706 having the largest diameter, the segment 702 having the second largest diameter, and the segment 704 having the smallest diameter (of the three segments 702, 704, 706). The segments 702, 704, 706 may have the same, coextensive center line 708 or may have different center lines. FIG. 7 also shows the spraying robot 102 in three different positions at different times as the spraying robot 102 moves from the right side to the left side in FIG. 7.

The control system 116 can automatically control how far each arm 138, 140 extends outward from the spraying robot 102 to engage the interior surface of the conduit 700 in the different segments 702, 704, 706. The control system 116 can direct different arms 138, 140 to extend outward different distances at different times so that the spraying head 136 moves along the center line 708 and remains centered in the conduit 700, even as the spraying robot 102 moves through the differently sized segments 702, 704, 706.

In one embodiment, the arms 138, 140 may include force sensors that measure the amount of force exerted by the arms 138, 140 on the interior surface 612 of the conduit 600. The control system 116 can automatically change how far each arm 138, 140 extends based on the forces measured by the sensors. For example, the control system 116 can individually adjust the extensions of the arms 138, 140 so that the forces do not exceed a threshold and/or the forces are equal or approximately equal (e.g., within 1% of each other, within 3% of each other, within 5% of each other, or the like). This can help keep the spraying head 136 along the center line 708 of the conduit 700, even as the spraying robot 102 moves through the different sized segments 702, 704, 706. Keeping the spraying head 136 in the center of the conduit 700 can help ensure that the coating applied to the interior surface is even or has an even thickness (e.g., a thickness that does not vary by more than 1%, by more than 3%, by more than 5%, or the like).

The control system 118 can receive inputs such as the inner or inside diameter(s) of the conduit 104 and send signals to the spraying robot 102 to move the arms 138, 140 outward or inward based on this diameter to cause the arms 138, 140 to engage the interior surface 124 of the conduit 104. If the diameter of the conduit 104 changes and/or the conduit 104 includes any bends or turns, the control system 118 can automatically determine the change in shape of the conduit 104 and adjust the positions of the arms 138, 140 to ensure the arms 138, 140 maintain contact with the interior surface 124 of the conduit 104 while the spraying head 136 remains centered in the conduit 104.

The control system 118 can receive input from an operator to change the moving speed of the spraying robot 102, to stop the spraying robot 102, to begin movement of the spraying robot 102, to change the rate at which the compound 108 is sprayed from the spraying robot 102, to change a position of any one or more of the arms 138 and/or 140, etc.

Figure 8:
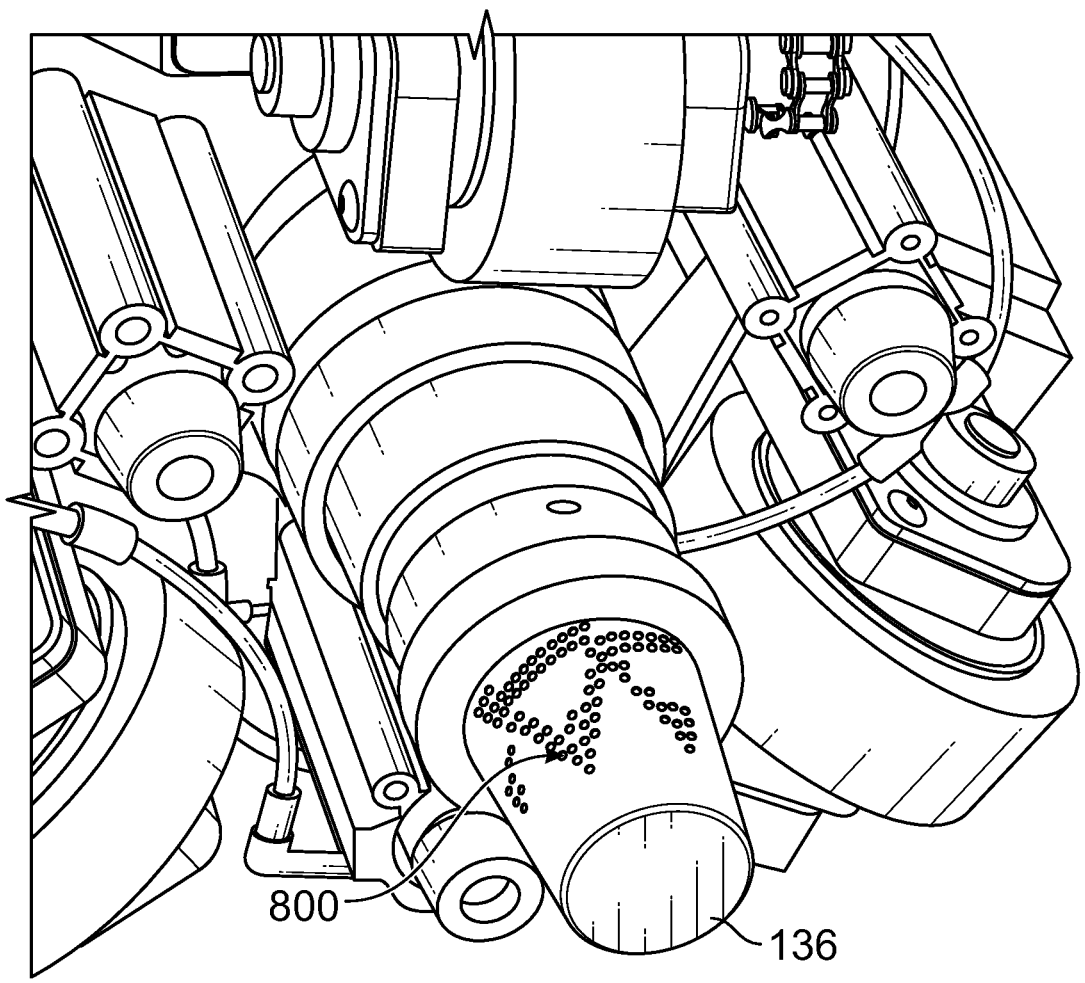
FIG. 8 illustrates a spraying head of the spraying robot.

FIG. 8 illustrates the spraying head 136 of the spraying robot 102. The interior of the spraying head 136 is supplied with the compound 108 from the hoses and cables 110. The spraying head 136 includes holes 800 through which the compound 108 is ejected from the spraying robot 102. The spraying head 136 can rotate such that centrifugal forces direct the compound 108 out of the holes 800 and onto the interior surface 124 of the conduit 104.

The spraying head 136 may rotate at a constant speed or the speed of rotation of the spraying head 136 may change. The control system 118 can control or change the speed at which the reel 112 pulls on the spraying robot 102 and/or the speed at which the arms 138 and/or 104 propel the spraying robot 102 to control the thickness of the coating sprayed onto the interior surface of the conduit 104 by the spraying head 136. For example, the control system 118 may cause the spraying robot 102 to move faster through the conduit 104 to form thinner coatings on the interior surface 124 and may cause the spraying robot 102 to move slower through the conduit 104 to form thicker coatings on the interior surface 124.

One or more cameras onboard the spraying robot 102 may send images or video to the output device(s) of the control system 118 (e.g., via the cables in the hoses and cables 110). These images or video can be viewed by an operator to identify any locations inside the conduit 104 that need additional coating. For example, one or more problem areas (e.g., areas with cracks, areas with voids, locations with changes in the geometry or shape of the conduit 104, etc.) can be visually identified by an operator viewing the images or video provided by the spraying robot 102. If the operator sees a location where more compound is needed (e.g., a problem area), the operator can provide input to the control system 118 to cause movement of the spraying robot 102 to slow or stop. This can allow more compound to be sprayed onto the problem area to form a thicker coating.

Figure 9:
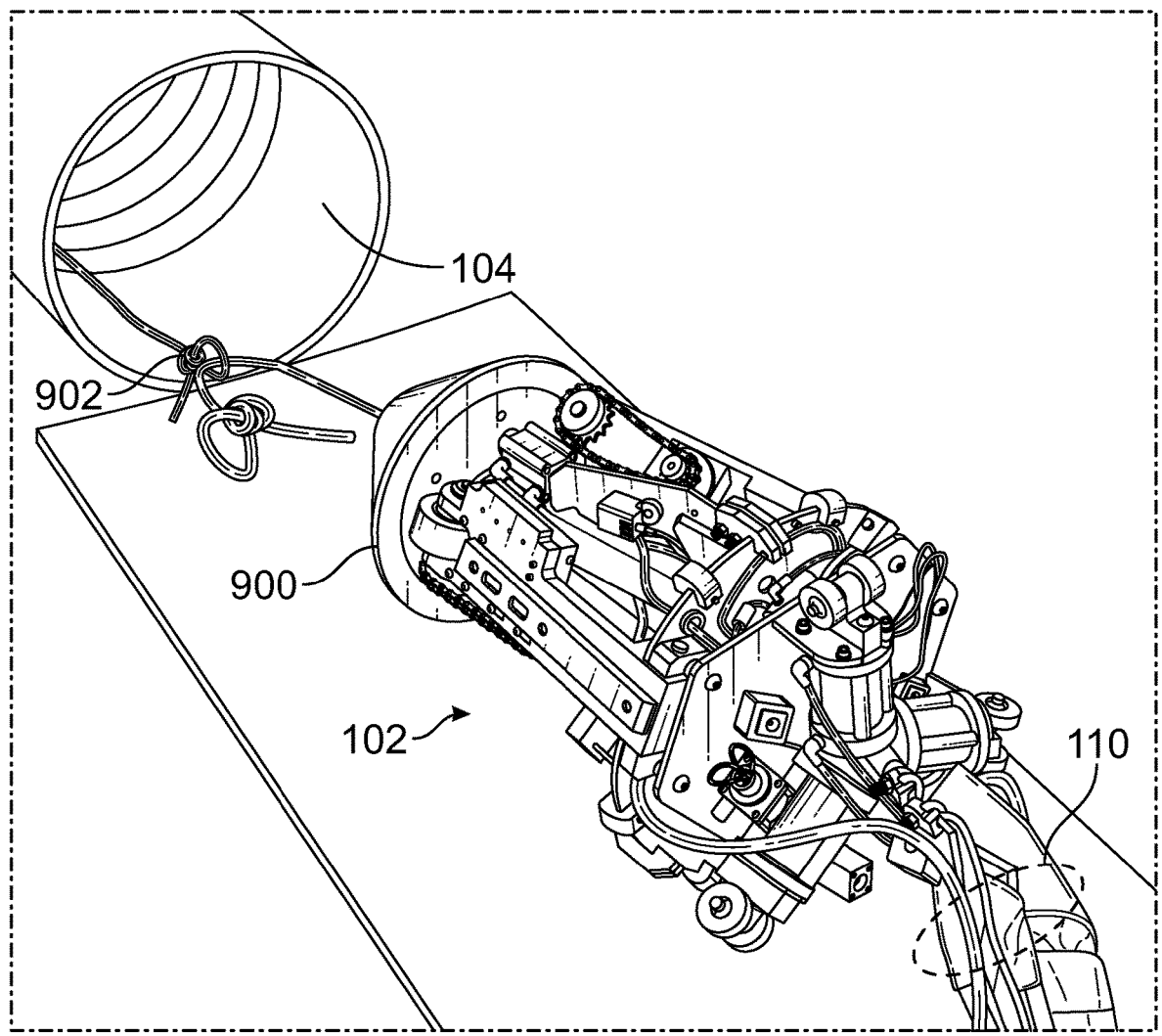
FIG. 9 illustrates the spraying robot with one example of a self-ejecting tow head device coupled with the spraying robot.
Figure 10:
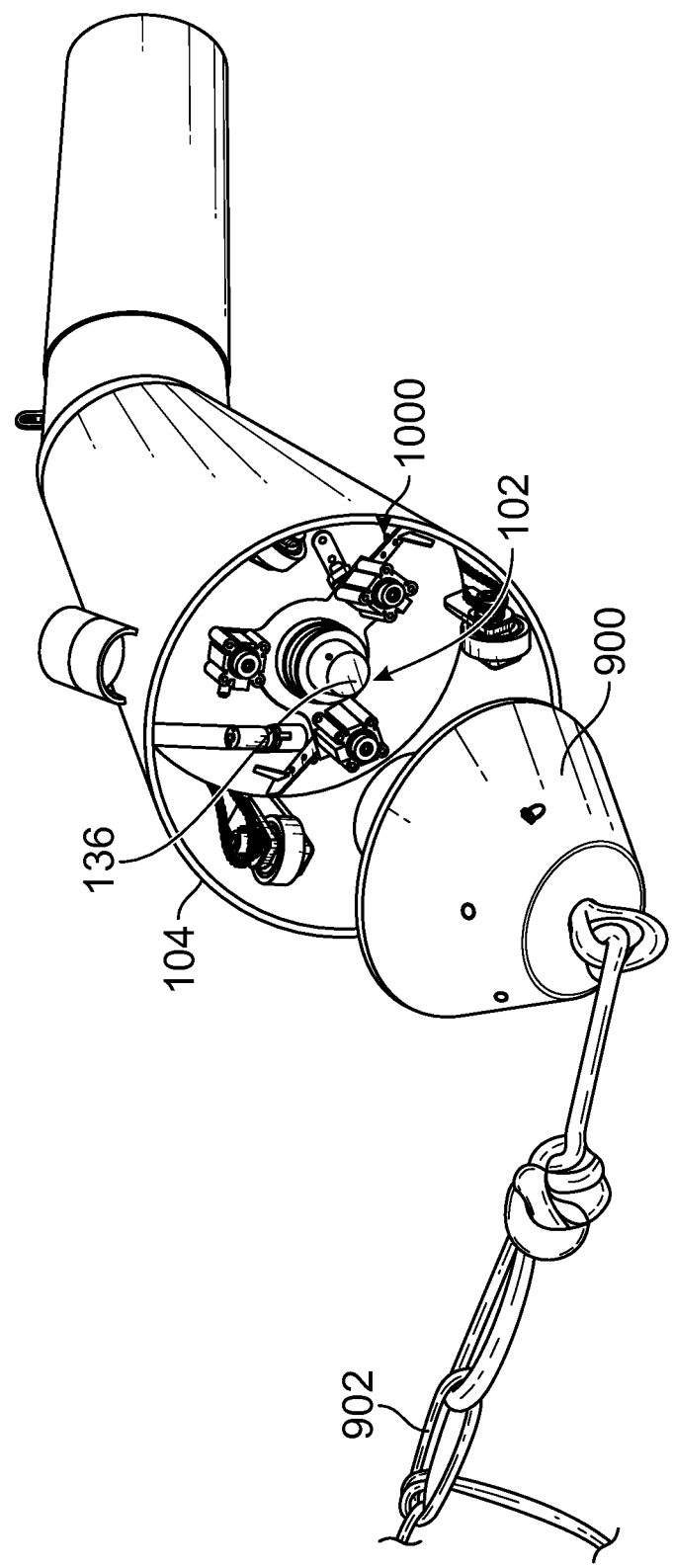
FIG. 10 illustrates the spraying robot with the tow head device decoupled from the spraying robot.

FIG. 9 illustrates the spraying robot 102 of the spray coating system 100 with one example of a self-ejecting tow head device 900 coupled with the spraying robot 102. FIG. 10 illustrates the spraying robot 102 with the tow head device 900 decoupled from the spraying robot 102. The tow head device 900 can be a protective body that is coupled with the spraying end 130 of the spraying robot 102 and is used to pull the spraying robot 102 into the conduit 104. The tow head device 900 also can protect the spraying head 136 from damage or dislodgement while the spraying robot 102 is being positioned in the conduit 104. The tow head device 900 is a conical or cone-shaped body that can couple with the spraying end 130 of the spraying robot 102 (e.g., via an interference fit, via magnets, or the like) and have a tow cable 902 (e.g., a rope, chain, or the like) attached. One end of the tow cable 902 can be connected with the tow head device 900 and the other end of the tow cable 902 can be inserted into the end 128 of the conduit 104 and pulled (e.g., through suction with a ball or other large object) into and through the conduit 104, and then out of the opposite end 126 of the conduit 104, as shown in FIG. 1. The spraying robot 102 can be pulled into the conduit 104 to the end 126. The tow head device 900 can then be detached from the spraying robot 102. For example, a burst or blast of air can be directed through the hoses 110 to the spraying head 136, and out of the holes 800 in the spraying head 136. This air can pneumatically disconnect the tow head device 900 from the spraying robot 102. Alternatively, a latch or other fastener can connect the tow head device 900 to the spraying robot 102, and the control system 118 can send a signal via the hoses and cable 110 to cause a motor on the spraying robot 102 to disconnect the latch or other fastener to allow the tow head device 900 to disconnect from the spraying robot 102.

Figure 11:
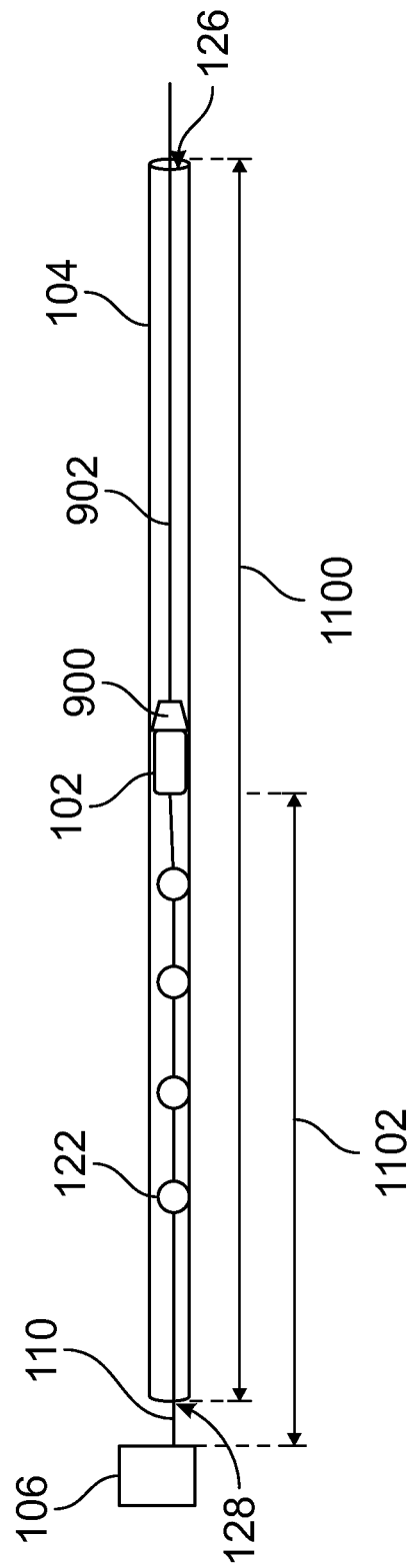
FIG. 11 illustrates one example of placement of the spraying robot in a long conduit using the tow head device and tow cable.

The tow cable 902 can then be pulled out of the end 127 of the conduit 104 to remove the tow head device 900 and the tow cable 902 from the conduit 104, while the spraying robot 102 remains in the conduit 104 (with the hoses and cables 110 and optional trucks 122 coupled with the spraying robot 102). This technique can be useful to position the spraying robot 102 in a very long conduit 104 without having to remove, expose, or otherwise disassemble the conduit 104. FIG. 11 illustrates one example of placement of the spraying robot 102 in a long conduit 104 using the tow head device 900 and tow cable 902. A distance 1100 between entrances and exits (e.g., ends 126, 128) of the conduit 104 may be longer than a maximum allowable length 1102 of the hoses and cables 110 that connect the spraying robot 102 with the base station system 106 (while also accounting for the distance from the base station system 106 and the closest end 128 of the conduit 104). The tow cable 902 and tow head device 900 can be used to pull the spraying robot 102 into a location 1104 in the conduit 104 (e.g., halfway between the ends 126, 128; as far as the hoses and cables 110 will allow; or another location). The tow head device 900 can then be detached from the spraying robot 102 and pulled out using the tow cable 902. The spraying robot 102 can then move through the conduit 104 to spray and coat the interior surface 124 in one segment 1106 of the conduit 104, as described above. The spraying robot 102 can then be repositioned in another location in the conduit 104 using the tow head device 900 and the tow cable 902 that allows the spraying robot 102 to spray and coat an additional segment 1108 or the remainder of the conduit 104 (that was not previously sprayed or coated).

The hoses of the hoses and cables 110 and/or the spraying robot 102 may have one or more reservoirs that receive one or more of the fluids used to form the compound that is sprayed on the interior surface 124 of the conduit 104. These reservoirs can adjust or control the timing at which the different fluids reach and mix with each other (e.g., in the spraying head 136 or in a mixing reservoir that is upstream of the spraying head 136). For example, the compound sprayed onto the interior surface 124 of the conduit 104 may be made from first and second liquids. The hose 110 carrying the first liquid may carry the first liquid directly to the spraying head 136 or the mixing reservoir coupled with the spraying head 136. The hose 110 carrying the second fluid may be fluidly coupled with one or more additional reservoirs that are upstream of the mixing reservoir and/or the spraying head 136. The additional reservoirs can delay when the second fluid reaches the mixing reservoir or spraying head 136 relative to the first fluid. This can help to time when the fluids begin mixing with each other when spraying begins. Because the fluids may have different viscosities, this delay can allow for the fluids to immediately begin mixing with each other to form the compound and to spray the compound before the compound begins to set or cure within the spraying head 136. As a result, the spraying robot 102 can be positioned inside the conduit 104, and potentially in a location that cannot be reached by any human operator, and begin spraying the compound without risking one of the fluids setting, curing, or otherwise solidifying before the other fluid is mixed to form the compound.

A method for coating an interior of a conduit also is provided herein. This method can be performed by one or more embodiments of the spray coating system 100. The conduit that is coated may be too small for an average human being to enter into and manually apply the coating. For example, the inner diameter of the conduit can be less than two feet, less than 1.5 feet, or the like. The method includes inserting the spraying robot into the conduit. The spraying robot optionally can be pulled to a position inside the conduit using the tow head device and tow cable, as described above. Once spraying is to begin, the control system may control pumps to deliver the fluids through separate hoses to the spraying robot. The fluids can mix in the spraying head or a reservoir, and then be flung out of the spraying head onto the interior surface of the conduit. The spraying robot can move within the conduit by being pulled by the hoses and cables and/or by self-propelling using the arms of the spraying robot. The arms can be manually or automatically controlled (and independently controlled) to move outward and/or inward to keep the spraying head of the spraying robot in the center of the conduit, as described above. When coating of the interior of the conduit is complete, the spraying robot is removed from the conduit. At least one practical application or effect of the inventive method includes the spraying of a coating onto an interior surface of a conduit having one or more changes in size (e.g., due to different stages or sections of the conduit having different inner diameters) and/or orientation (e.g., due to one or more bends or turns in the conduit) that may not otherwise be able to be coated by one or more known coating systems and methods.

In one embodiment, a spray coating system includes a spraying robot sized to fit within a conduit. The spraying robot includes arms that extend outward and retract inward to maintain contact with an interior surface of the conduit. The spraying robot is configured to be coupled with hoses that separately supply different fluids to the spraying robot. The spraying robot includes a spray head from which a compound formed from the fluids is sprayed onto the interior surface of the conduit. The spraying robot is configured to be pulled through the conduit and/or self-propel in the conduit to spray the compound onto the interior surface of the conduit and form a coating thereon.

One or more of the arms can include a wheel or tread that is rotated to self-propel the spraying robot in the conduit. Two or more of the arms can be separately controllable to extend from the spraying robot or retract toward the spraying robot by different distances at the same time. Two or more of the arms can be separately controlled to change positions to maintain contact with the interior surface of the conduit while keeping the spray head in a center of the conduit as the conduit includes one or more bends or changes in inner diameter. Alternatively, the arms may be controlled as a group with two or more (or all) of the arm retracting outward or contracting inward together.

A first set of the arms can be disposed closer to a leading end of the spraying robot than a trailing end of the spraying robot and a second set of the arms is disposed closer to the trailing end of the spraying robot than the leading end of the spraying robot. The spraying head can be disposed on or closer to a trailing end (than a leading end) of the spraying robot as the spraying robot moves in the conduit in a direction away from the spraying head.

The system also can include one or more rolling trucks or sleds configured to support at least part of the hoses above the interior surface of the conduit. The spraying robot can be coupled with a base station system that is outside of the conduit by one or more cables. The spraying robot can be pulled through the conduit by the base station system while spraying the compound onto the interior surface of the conduit. The spraying robot can include one or more reservoirs upstream of the spraying head to permit the fluids to be mixed and sprayed as the compound without delaying supply of at least one of the fluids. The system also can include a tow head device that can be coupled with the spray head and to a tow cable. The tow head device can be pulled by the tow cable to pull the spraying robot into a location within the conduit. The tow head device can separate from the spraying robot and be removed from the conduit prior to spraying the compound on the interior surface of the conduit. The spraying robot can include one or more cameras configured to output images or video to an output device disposed outside of the conduit.

In another example, a spray coating system includes a spraying robot sized to fit within a conduit. The spraying robot may include movable arms that maintain contact with a changing interior surface of the conduit as the spraying robot moves through the conduit. The spraying robot may move through the conduit and spray a compound onto the interior surface of the conduit and form a coating thereon as the spraying robot moves along the changing interior surface of the conduit.

The movable arms of the spraying robot may remain engaged with the changing interior surface of the conduit as the spraying robot moves along and sprays the compound onto the interior surface of the conduit. The movable arms of the spraying robot may remain engaged with the changing interior surface of the conduit as the conduit includes one or more of a changing inner diameter or a bend. The movable arms of the spraying robot may separately move by different distances at a same time. The spraying robot may include a spray head from which the compound is sprayed onto the interior surface of the conduit. The movable arms may separately move to maintain contact with the interior surface of the conduit while keeping the spray head of the spraying robot along a center of the conduit.

In another example, a method (e.g., for coating an interior surface of a conduit) may include propelling a spraying robot through an interior of the conduit while maintaining contact between the spraying robot and the interior surface of the conduit during one or more of changes in an inner diameter of the conduit or bends in the conduit. The method also may include spraying a compound from the spraying robot onto interior surfaces of the conduit as the spraying robot moves through the interior of the conduit while maintaining the contact between the spraying robot and the interior surface of the conduit during the one or more of the changes in the inner diameter of the conduit or the bends in the conduit.

Propelling the spraying robot may include engaging the interior surface of the conduit with separately movable arms of the spraying robot that maintain the contact between the spraying robot and the interior surface of the conduit during the one or more of the changes in the inner diameter of the conduit or the bends in the conduit. Engaging the interior surface of the conduit with the separately movable arms of the spraying robot may include moving the separately movable arms different distances from the spraying robot to maintain the contact between the spraying robot and the interior surface of the conduit during the one or more of the changes in the inner diameter of the conduit or the bends in the conduit. The compound may be sprayed from a spray head of the spraying robot that remains in a center of the conduit while maintaining the contact between the spraying robot and the interior surface of the conduit during the one or more of the changes in the inner diameter of the conduit or the bends in the conduit.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions, numerical values, and types of materials described herein are intended to define the parameters of the inventive subject matter, they are by no means limiting and are exemplary embodiments. Many other embodiments will be apparent to persons of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

The methods described herein may be performed using one or more tangible and non-transitory components, such as one or more processors, controllers, computers, or other devices. The operations described in connection with the methods may be directed by one or more sets of instructions stored on a tangible and non-transitory computer readable medium. For example, software code stored on a tangible and non-transitory memory may be used to direct one or more processors to carry out the operations of the methods.

This written description uses examples to disclose several embodiments of the inventive subject matter and also to enable a person of ordinary skill in the art to practice the embodiments of inventive subject matter, including making and using any devices or spray coating systems and performing any incorporated methods. The patentable scope of the inventive subject matter is defined by the claims, and may include other examples that occur to persons of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A spray coating system comprising:
 a spraying robot sized to fit within a conduit, the spraying robot including arms that radially extend outward and radially retract inward to maintain contact with an interior surface of the conduit, the arms having force sensors that measure forces exerted by the arms on the interior surface of the conduit, the spraying robot configured to be coupled with hoses that separately supply different fluids to the spraying robot, the spraying robot including a spray head from which a compound formed from the fluids is sprayed onto the interior surface of the conduit, the spraying robot configured to one or more of be pulled through the conduit or self-propel in the conduit to spray the compound onto the interior surface of the conduit and form a coating thereon;
 one or more rolling trucks or sleds that lift and maintain all of the hoses inside the conduit above the interior surface of the conduit; and
 a control system controlling movement of the arms toward and away from the interior surface of the conduit, the control system automatically and individually changing extension and retraction of each of the arms based on the forces measured by the force sensors for maintaining the spray head in a center of the conduit.

2. The spray coating system of claim 1, wherein one or more of the arms includes a wheel or tread that is rotated to self-propel the spraying robot in the conduit.

3. The spray coating system of claim 1, wherein two or more of the arms are separately controllable by the control system to extend from the spraying robot or retract toward the spraying robot by different distances at the same time.

4. The spray coating system of claim 1, wherein the control system controls the movement of the arms to maintain contact of the arms with the interior surface of the conduit while keeping the spray head in the center of the conduit as the conduit includes one or more bends or changes in inner diameter through which the spraying robot moves.

5. The spray coating system of claim 1, wherein a first set of the arms is disposed closer to a leading end of the spraying robot than a trailing end of the spraying robot and a second set of the arms is disposed closer to the trailing end of the spraying robot than the leading end of the spraying robot.

6. The spray coating system of claim 1, wherein the spraying head is disposed on a trailing end of the spraying robot as the spraying robot moves in the conduit in a direction away from the spraying head.

7. The spray coating system of claim 1, wherein the spraying robot is configured to be coupled with a base station system that is outside of the conduit by one or more cables, and the spraying robot is configured to be pulled through the conduit by the base station system while spraying the compound onto the interior surface of the conduit.

8. The spray coating system of claim 1, wherein the spraying robot includes one or more reservoirs upstream of the spraying head to permit the fluids to be mixed and sprayed as the compound without delaying supply of at least one of the fluids.

9. The spray coating system of claim 1, further comprising:
a tow head device configured to be coupled with the spray head and to a tow cable, the tow head device configured to be pulled by the tow cable to pull the spraying robot into a location within the conduit, the tow head device configured to pneumatically disconnect from the spraying robot while in the conduit and be removed from the conduit while the spraying robot remains in the conduit prior to spraying the compound on the interior surface of the conduit.

10. The spray coating system of claim 1, wherein the spraying robot includes one or more cameras configured to output images or video to an output device disposed outside of the conduit.

11. A spray coating system comprising:
a spraying robot sized to fit within a conduit, the spraying robot including arms that are pneumatically controlled to radially extend outward and radially retract inward to maintain contact with an interior surface of the conduit as the spraying robot moves through the conduit, the spraying robot configured to be coupled with hoses that separately supply different fluids to the spraying robot, the spraying robot including a spray head on a trailing end of the spraying robot from which a compound formed from the fluids is sprayed onto the interior surface of the conduit, one or more of the arms including a wheel or tread that is rotated to propel the spraying robot through the conduit to spray the compound onto the interior surface of the conduit and form a coating thereon, the arms having force sensors that measure forces exerted by the arms on the interior surface of the conduit, a control system configured to individually and separately extend the arms outward and retract the arms inward based on the forces that are measured, and to keep the spray head of the spraying robot in a center of the conduit as the spraying robot moves through one or more of a bend in the conduit or a change in inner diameter of the conduit.

12. The spray coating system of claim 11, wherein the spraying robot includes one or more reservoirs upstream of the spraying head to mix the fluids and spray the compound without delaying supply of at least one of the fluids.

13. The spray coating system of claim 11, further comprising:
one or more wheeled rolling trucks that lift and support the hoses within the conduit above the interior surface of the conduit while rolling or sliding along the interior surface of the conduit.

14. The spray coating system of claim 11, wherein the arms include spraying end arms and leading end arms, the one or more of the arms having the wheel or the tread included in the leading end arms, the spraying end arms having freely rotating wheels or rollers that freely rotate on the interior surface of the conduit without generating propulsive force.

15. The spray coating system of claim 11, further comprising the control system that controls a thickness of the coating sprayed on the interior surface of the conduit by the spraying robot by changing a speed at which the arms propel the spraying robot.

16. The spray coating system of claim 11, wherein the arms include trailing end arms and leading end arms, one or more of the leading end arms including one or more motors that propel or assist in propelling the spraying robot along the interior surface of the conduit.

17. The spray coating system of claim 16, wherein the trailing end arms do not include any motors and do not propel or assist in propelling the spraying robot along the interior surface of the conduit.

18. The spray coating system of claim 11, further comprising the control system that receives images of the interior surface of the conduit and controls a thickness of the coating sprayed on the interior surface of the conduit based on the images.

* * * * *